Dec. 31, 1957   L. H. LAMOURIA   2,818,160
FRUIT SPREADING APPARATUS
Filed Nov. 13, 1956   4 Sheets—Sheet 1

INVENTOR.
LLOYD H. LAMOURIA
BY
Lippincott & Smith
ATTORNEYS

Dec. 31, 1957 L. H. LAMOURIA 2,818,160
FRUIT SPREADING APPARATUS
Filed Nov. 13, 1956 4 Sheets-Sheet 2

INVENTOR.
LLOYD H. LAMOURIA
BY
*Lippincott & Smith*
ATTORNEYS

Dec. 31, 1957 L. H. LAMOURIA 2,818,160
FRUIT SPREADING APPARATUS
Filed Nov. 13, 1956 4 Sheets-Sheet 3

INVENTOR.
LLOYD H. LAMOURIA
BY
Lippincott & Smith
ATTORNEYS (a)

(d)

(b)

(e)

(c)

United States Patent Office 2,818,160
Patented Dec. 31, 1957

2,818,160

FRUIT SPREADING APPARATUS

Lloyd H. Lamouria, Davis, Calif., assignor to The Regents of the University of California, Berkeley, Calif., a corporation of California Application November 13, 1956, Serial No. 621,682

18 Claims. (Cl. 198—33)

This invention constitutes a continuation-in-part of application Serial No. 537,086 filed on September 28, 1955, and now abandoned, by the same inventor and relates to fruit processing apparatus and is particularly concerned with a device to spread fruit components on receiving surfaces for preserving and drying.

The invention, as it is constituted, makes provisions for handling fruit components which have already been divided by suitable slicing or cutting mechanisms into substantially equal-size parts, from each of which the pit or stone has been removed. The fruit halves are supplied in any appropriate fashion to the spreading mechanism and when handled by it they are arranged to be placed automatically upon suitable preserving and drying surfaces or conveying mechanisms from which they may be passed through the drying and processing equipment.

The invention will be set forth in a way by which fruit components, such as halves of drupes, although any form of fruit cut into substantially half-size parts can be used, are fed along a conveying mechanism from which it is discharged onto appropriate channel sections or troughs along which it is caused to slide under either the force of gravity or due to external forces providing a transverse vibratory motion to cause the supported articles to move either upwardly or downwardly or horizontally to be discharged upon a receiving surface such as an accumulating tray or conveyor. The vibratory motion is usually provided even where the articles move downwardly along the channels or troughs. The trough along which the fruit halves slide is preferably V-shaped and is notched inwardly toward the apex of the V in the region of discharge. Normally, the fruit halves are dropped or moved into the trough immediately beneath which the collector trays or conveyors are arranged to pass. In one form of the device the trough is tilted at an appropriate angle relative to the collecting trays or conveyor, with the apex of the V-section faced toward the collector. The slope of the trough with respect to the collecting surface area and the depth of the notch cut into the trough toward the V apex provide, in combination, a discharge region for the sliding fruit such that the apex of the V-shaped trough is relatively only a short distance closer to the collector surface than is the upper portion of the side walls of the trough where from which the fruit sections are discharged.

The invention has been provided for discharging fruit which is in a state or condition ready for immediate drying following cutting or halving, and consequently the internal surfaces toward the region from which the removal of the pit or stone of the fruit pieces has occurred are generally moist. When the fruit halves are dropped or otherwise moved upon the conveyor, some fruit halves face the cup-side (this would correspond to the cut edge and the surface from which the pit or stone is removed) adjacent to the wall of the conveyor, whereas other fruit sections fall upon the conveyor with the rounded or outer skin side against the conveyor wall. In either case, but particularly in the cup-side down state, it is desirable to vibrate the trough to insure motion of fruit along the walls of the trough. With the cup-side of the halved fruit sections resting against the trough wall, the individual fruit pieces are in a generally stable position whereas, with the cup-size up, the position is less stable. Vibration of the trough tends to move the fruit pieces to the ejection point from which the fruit has negligible tendency to fall in other than cup-side-up position upon discharge. Generally speaking, the trough from which the fruit halves are discharged is vibrated at a relatively high frequency which is dependent upon the slope of the trough or chute, its vibrational characteristics and the density of the fruit, it being noted that the vibration occurs along a path which is normal to the movement of the fruit pieces at discharge.

The described apparatus is frequently used with the fruit-receiving trough means vibrated and arranged so that the fruit half-section pieces are moved therethrough in a generally downwardly direction toward the receiving surface, such as the collector trays or conveyors. In this way movement of the fruit toward the collector trays or conveyors is assisted to some extent by the force of gravity, in addition to the vibration induced in the trough member. However, for some conditions of operation it is preferable to vibrate the trough at a frequency such that the mass vibration rate causes the half-section pieces to move upwardly through the trough means to be discharged to a collector tray or conveyor from the discharge end of the trough means. The discharge end is located above the point at which the fruit half-section pieces are supplied to the trough for this type of operation. Accordingly, the slope of the trough means may be either positive or negative, that is, up or down, or in some instances it may extend even generally horizontally between the loading position and the discharge region. The direction of movement of the fruit half-section pieces accordingly is substantially dependent upon the mass frequency for a determination of the direction toward which the fruit pieces are moved to be discharged. The reason why the half-section pieces do not readily roll with gravity in the downwardly sloping trough means is believed to be due largely to the fact that the cut sections are generally sticky and consequently there is a strong tendency to adhere to the side walls of the troughs.

The notching or recessing of the trough in the direction of the trough apex provides a structure such that with the fruit pieces resting upon the trough walls, as the lower part of each fruit piece (that is the fruit part resting closest to the V apex) at discharge, will fall gravitationally toward the collecting surface, whether it be a tray or a conveyor. This places the fruit in such position that in the falling path the contact point with the tray or conveyor is at the edge of the fruit piece. Consequently, the contacting point is in a position such as to form a fulcrum about which the fruit piece may rotate. The center of gravity of the falling piece of fruit as it is discharged from the trough is considerably at one side of the initial contact point with the receiving surface and consequently, due to the effect of gravity the individual fruit pieces as they strike the collecting surface, will turn to a stable position and be caused to assume a position of rest in a direction such that after collected they remain in a cup-side up position.

Various ways to discharge the cut fruit sections to the trough may be provided, included among which is the use of a so-called sweeper blade or paddle collectively moving a complete group of fruit components from a conveyor mechanism onto the multiplicity of discharge troughs at regular intervals, so as to keep the troughs generally full during the operation period.

From the foregoing it becomes an object of this invention to provide for rapidly feeding fruit sections to collector components in the form of trays or conveyors in a way such that the fruit may be caused to arrive at the conveyor in cup-side up fashion, in order to be dried most rapidly and uniformly.

A further object of the invention is to provide fruit handling apparatus wherein divided fruit components indiscriminately supported on one form of conveying mechanism may be shifted to another form of conveying mechanism to arrive at the second form of conveying mechanism in a uniformly positioned arrangement, insofar as the relative positioning of the components with respect to cut or severed edges is concerned.

Other objects of the invention are those of providing fruit handling devices which are efficient in use, rapid in operation, which include a minimum number of parts, and which function efficiently to spread and arrange fruit for drying and preserving purposes.

Still other objects and advantages of the invention will become apparent by reading of the following description and claims in connection with the accompanying drawings. To illustrate the apparatus, both schematically and structurally in its preferred form by the drawings, Fig. 1 is a schematic isometric view showing generally the arrangement of the various components with respect to each other;

Figure 5:
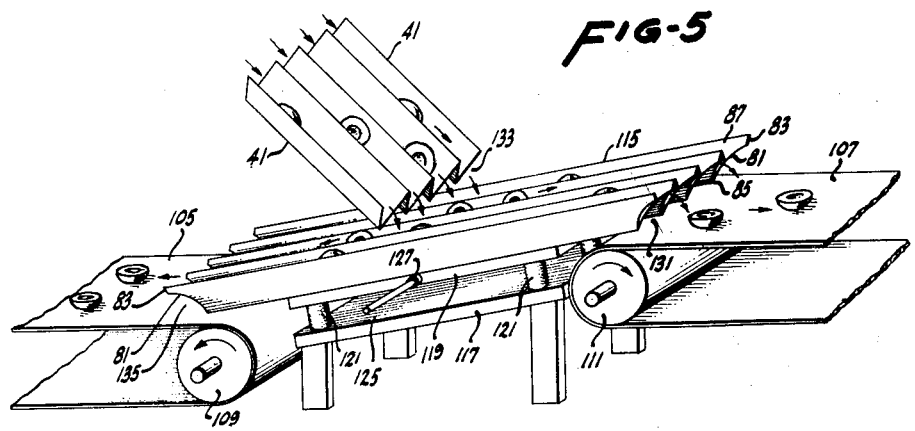
Figure 6:
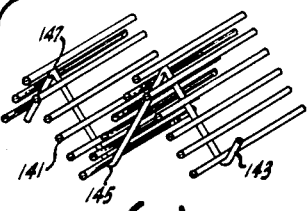
Figure 6:
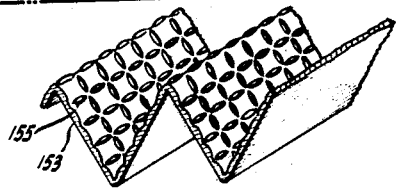
Figure 6:
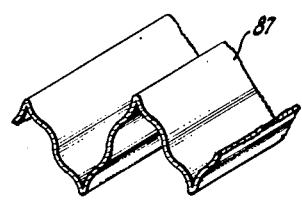
Figure 6:
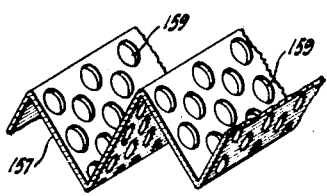
Figure 6:
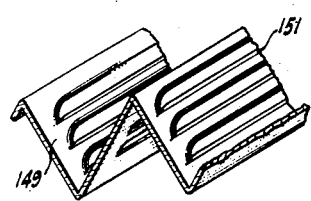

Fig. 5 is a modification by the use of which the discharged fruit sections may be caused to fall upon either one of two different conveyor devices depending upon whether the fruit movement through the discharge trough means is upward against the force of gravity or downward with an aiding gravitational component serving to cause the fruit to move longitudinally of the trough means; and Fig. 6 includes parts (a) through (e) which show the trough means formed with the side members or walls in the form of (a) rods or tubes of any desired outward configuration, (b) corrugated members, (c) louvered members, (d) in checkered formation; and (e) as perforated generally planar surfaces.

Referring now to the drawings for a further understanding of the invention, fruit, after having been divided into sections 11, each of which represents a division into a substantially half-part cut along the suture plane of a drupe, such as an apricot, a peach or the like, are discharged from the cutting mechanism (not shown) and fed along a conveyor belt mechanism 13 arranged to move in the direction indicated by the arrow. The belt 13 passes about a suitable drive pulley 15 mounted to turn on a shaft 17 which is driven from any suitable form of drive such as the belt cord or chain conventionally shown at 19. The fruit pieces or sections 11 move along with the belt and at selected and periodic intervals are swept or pushed off the edge of the belt by a sweeping blade or paddle 21 which is carried upon a pair of arms 23 and 24 which are, in turn, secured to a drive shaft 25. Suitable driving mechanism for rotating the shaft 25 and with it the sweeping blade or paddle 21, is provided by a drive from the shaft 17 to which a drive pinion or sprocket 27 is appropriately keyed. Drive chain 29 is connected about the driving sprocket 27 to drive a driven sprocket 31 appropriately keyed to a shaft 33 and which, through the conventionally indicated gear box 35, is caused to rotate the shaft 25.

The driving relationship established between the drive pinion 27 secured to shaft 17 and the driven pinion or sprocket 31 secured to the shaft 33 is such that the combination driving through the gear box 35 causes the sweeper blade or paddle 21 to make one revolution in the indicated direction during the time the conveyor belt moves a longitudinal distance corresponding to the length of the sweeper blade. The shafts 17 and 25 are supported in purely conventional fashion upon suitable bearings (not shown in detail) carried by support members secured to a frame 37 at various points. The conveyor belt 13 rests at its edges on a pair of angle brackets or channel sections 38 and 39 and may, where desired, pass across a support surface 40 which spans the distance between the brackets and extends down the conveyor length for a distance at least equal to the length of the blade 21, so that any possibility of belt sag in the region of discharge of the conveyed fruit pieces is eliminated.

There is carried from the support frame 37 and extending outwardly therefrom a multiplicity of adjacently positioned V-shaped troughs having an open end of each V located substantially adjacent to the channel sections 38 and immediately below the plane of the conveyor belt 13. Each time the sweeper blade or paddle 21 traverses the conveyor belt 13 in a path normal (i. e., transverse) to the path of conveyor belt movement, all fruit pieces carried upon the belt within the length of the blade at the instant are swept laterally from the belt to be discharged onto the V-shaped troughs along which they slide gravitationally, as indicated by the arrows. The fruit halves, when falling upon the trough members 41, may fall in any position in random fashion, and since the trough is maintained in a fixed position with respect to the apparatus framework 37, it is only due to the effects of gravity that the fruit pieces move down the trough 41 to be discharged from it onto a second V-shaped trough 43. The trough 43 is of a V-shaped configuration generally like that of the trough 41, and is arranged with respect to the trough 41 so that one V-shaped section of the trough 43 is below each V-shaped section of the trough 41. The trough 43 serves as the discharge trough from which the fruit components or sections 11 are discharged upon a suitable collector or discharge surface 45.

In the forms by which the invention is shown, the collectors are illustrated as trays having side wall sections 47 and end wall sections 49, which are arranged to be moved by a pair of driven conveyor belts 51 and 52. The belts 51 and 52 are positionally held by support surfaces 53 and 54 supported, respectively, upon brackets 55 and 56 held by a frame mechanism 57.

Also carried from the frame in any suitable fashion are a pair of belt drive pulleys 59 supported upon suitable shaft elements 61, which are journalled in suitable bearings (not shown) secured to the frame 57 in any desired fashion. The conveyor belt is preferably driven from the same prime mover used to drive the belt or chain mechanism 19 so that with motion of the conveyor belts in the direction indicated any suitable collector tray 45 rested thereupon will be moved with the conveyor beneath the discharge end 63 of the discharge troughs 43. The discharge troughs are carried by an arm (or a pair of arms) 65 pivotally mounted, as at 67, from the framework 57. Extending outwardly from the arm 65 there is an end plate 69 to which a bottom plate 71 is secured. The bottom plate 71 forms the support for the V-shaped discharge trough 43. The end and bottom plates 69 and 71 are carrier, in turn, from suitable brackets 73 which form a structurally firm support but which resiliently or flexibly secure these members to a lateral support plate 75 which, in turn, is held by and secured to the arms 65 and pivotally mounted at 67, as above stated, to the frame 57.

Figure 2:
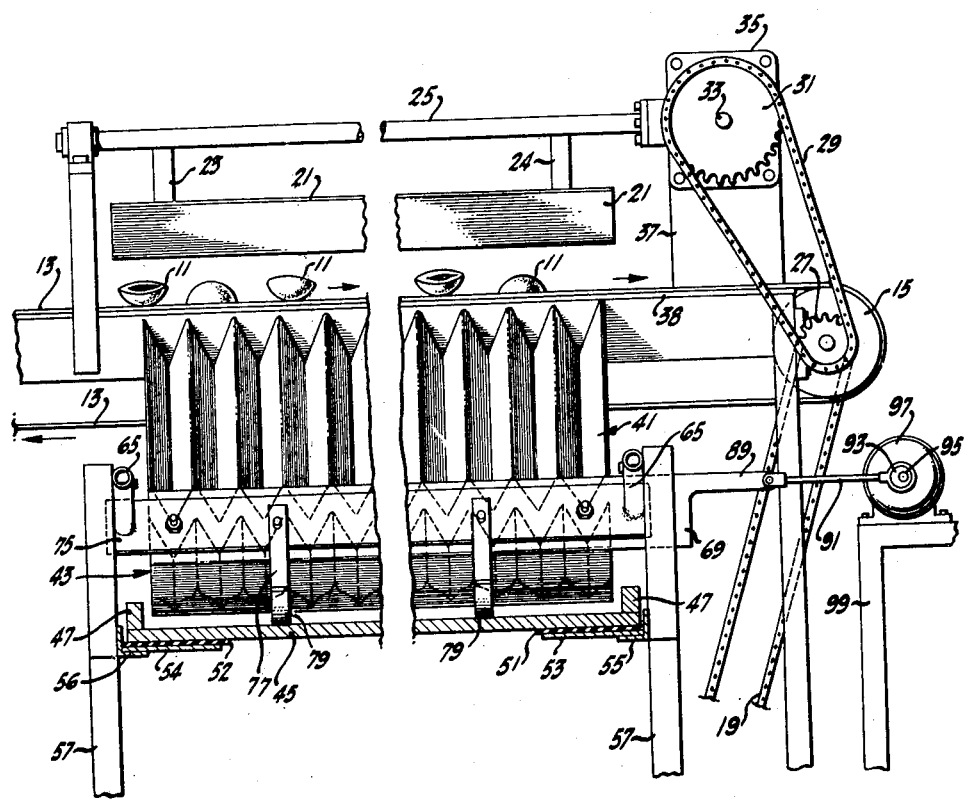
Fig. 2 is an end view of the apparatus to show the relative locations of the conveyor mechanism for feeding the fruit, the fruit discharge troughs and the collecting device.
Figures 3, 4:
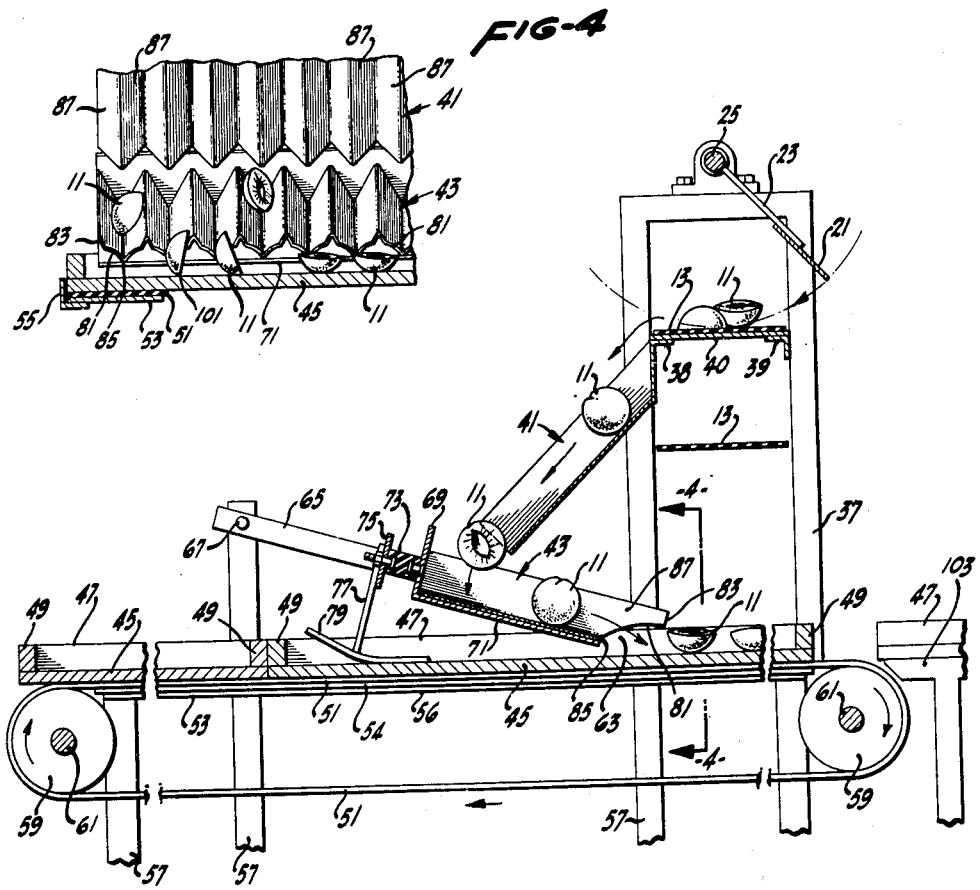
Fig. 3 is a view in elevation and partly in section to show the path taken by the fruit in its discharge from the conveyor mechanism, the view being taken substantially on the line 3—3 of Fig. 2.
Fig. 4 is a view, partly in section, taken on the line 4—4 of Fig. 3 to show the discharge of individual fruit pieces from the feed trough and indicating the orientation of the fruit in cup-side up fashion with respect to the collector surface of the collecting device.

There is also secured to the lateral support plate 75 and extending downwardly therefrom an elevator or support member 77 which has a contact shoe 79 shown, for instance, particularly by Figs. 2 and 3, secured at one end. The shoe 79 may rest on the discharge surface which receives the fruit pieces or, alternatively, it may rest clear of the tray provided the arms 65 are caused to rest upon a suitable limiting stop. In the latter case when the shoe is appropriately placed with its rear surface substantially planar either to ride along or adjacent to the discharge surface and its forward surface, which is faced in the direction from which the collector surfaces move to receive the discharged fruit, is upwardly curved so that for conditions where the end walls of collecting trays 45 extend higher than that of the discharge point of the V-shaped discharge trough 43, a motion of the trays will serve to raise the contact shoe and with it the discharge trough by an amount sufficient to permit the end of the discharge trough to clear the wall of the tray. This also prevents trays with high end walls from contacting the plates 69 and 71.

Preferably the spacing between the inner edge of the flat surface of the contact shoe and the discharge point of the V-shaped discharge trough is approximately the width of an article receiving tray, so that successive trays, as moved, raise and lower the discharge point substantially precisely the time when the tray edges move beneath the discharge end of the trough and when the tray ends move the shoe the input end of trough 43 and its plate 69 is clear of the tray.

The discharge trough, as is particularly evident from the showings of Figs. 3 and 4, is formed at its forward end in such a way that there is a notch 63 formed from the outermost end of the V-shaped side wall starting part way inwardly from the edge of the wall and at a point such as 83 which is inward from the edge in the direction of the apex and laterally spaced from the apex by about one-third the diameter of a fruit piece. The notch extends in a generally arcuately shaped pattern inwardly to the V apex at 85. The fruit pieces sliding down by gravity along the steep V-shaped trough 41 fall from it (see Fig. 3) onto the discharge V-shaped trough 43, which is positioned at a smaller or lower angle with respect to the collector surface. Fruit pieces 11 discharged from the V-shaped trough 41 tend to fall upon the side walls 87 of the V-shaped discharge trough 41 in such a way that they preferably rest thereon in cup-side down fashion, although cup-side up operation is also feasible. Because of the fact that the fruit pieces represent half sections of drupaceous fruits (according to the preferred form of the invention) and generally are pieces of fruit which has been cut into halves immediately before being placed upon the conveyor mechanism 13, it will be apparent that there is a good deal of moisture and stickiness to the fruit surface of the half section. Consequently, there is always a tendency of the fruit to adhere to the side walls 87 of the V-shaped discharge trough 43. This is true despite the fact that the trough 43 is tilted to some extent, and the fruit is moved along the trough either due to the trough vibration or due to a mere gravitational force.

To preclude the possibility of the fruit adhering to the side walls of the discharge trough a mechanism is provided rapidly to vibrate the trough in a direction transverse to that along which the collector device 45 and the conveying mechanism therefor 51, is moved. This vibratory motion is introduced by the connection of the arm 89 to the end plate 69 and linking to this arm a suitable connecting rod 91 attached at its opposite end to an eccentric 93. The eccentric is carried upon the shaft 95 of the conventionally represented motor or other prime mover 97 held upon a suitable support frame 99. The eccentricity of the eccentric 93 is only enough to provide for the arm 89 secured to the end plate 69 being able to vibrate the complete discharge V-shaped trough for a very limited amount with respect to its resilient connection through the bracket 73 to the end plate 75, although the vibration occurs at a relatively high rate.

The vibration frequency is semi-critical and depends upon factors such as the density of the fruit to be discharged, the precise slope provided for the V-shaped discharge trough or chute 43, whether the fruit is to be moved with gravity (that is, downwardly as per Figs. 1, 2 and 3) or against gravity (that is, upwardly, as by Fig. 5) and the general vibrational characteristics of the channel along which the fruit is moved. By providing the vibration, the fruit pieces 11 are caused to generally slide along the side walls 87 of the V-shaped discharge trough 43 rather than to roll with respect thereto. Discharge action, accordingly, is such that as the fruit pieces are vibrationally moved while resting cup-side down against the side walls 87 and because of the notched end 63 of the V-shaped discharge trough, one edge 101 (see Fig. 4) of the fruit piece first comes to rest upon the receiving surface.

The surfaces upon which the fruit pieces are discharged are usually spaced closer to the upper end of the notch 63 than the diameter of the fruit piece to be discharged. This permits the fruit piece to be guided by the trough side wall as its edge 101 strikes the receiving surface and movement of the receiving surface quickly moves the fruit piece away from the trough after it falls.

At the time the fruit pieces fall so that the edge 101 reaches the receiver surface it will be appreciated that at this point the major weight of the fruit section is (looking, for instance, at the illustration of Fig. 4) to the left of the point of first contact with the result that because of the fact that the center of gravity of the individual fruit pieces is thus at one side of the first point of contact the force of gravity also tends to turn the fruit piece in a direction such that it rotates about its curved outer surface and comes to rest in cup-side up fashion (see Fig. 4), on the collector surface. Accordingly, as the fruit pieces are thus discharged from the trough 41 the part of the fruit half-section which is nearest the upper edge of the side wall of the V-shaped discharge trough remains in contact with the trough longer than does the lowermost edge, and the result is that the fruit piece tends to slide in the direction of the V apex to a point where the contact between the wall 87 and the fruit piece 11 can no longer be maintained and the fruit falls to assume the positions conventionally represented particularly by Figs. 1 and 3.

As the discharge of the fruit takes place it will be apparent that one piece of fruit is being discharged from each of the trough sections at substantially the same time due to the fact that the sweeping blade or paddle 21 moves a complete group of fruit sections from the belt or conveyor 13 into the V-shaped troughs concurrently. This then provides, where the V-shaped discharge troughs extend for a width substantially corresponding to that of either the trays, to receive the article, or the conveyor belt to receive them, an arrangement whereby fruit pieces are generally alined transversely as well as longitudinally of the receiving mechanism, with an extremely efficient space utilization. For conditions where the fruit pieces are to be received by receiving trays, as herein illustrated for reference purposes, the successive trays are fed from the conveyor mechanism to rest upon a table surface 103, from which they can be manually transported to preserving and drying components, or from which they can be transferred to other suitable conveying mechanisms.

Where the fruit pieces are to be fed through the drying and preserving regions after being spread upon the receiving surfaces 45 without being transferred from the conveyor mechanism, it will be appreciated that the pieces may fall directly upon a conveyor belt such as 51 which, in such a case, will extend the complete width of the support frame and rest upon a support surface which, under such circumstances, likewise may extend the complete width of the support frame.

The belt drive pulley element 59 and its shaft 61 then may be moved beyond the view contemplated by the figure so as to permit an elongated conveyor to pass into the components where drying and fruit preservation processes are carried forward. These, per se, form no specific part of the invention except as functioning together with the discharge mechanism, and constitute further adaptations of the device herein disclosed.

In the description of the invention a multiplicity of feed troughs has been disclosed for depositing fruit half-sections upon a receiving surface. Such an arrangement is to be preferred but note is made of the fact that it is within the spirit and scope of the invention as herein disclosed to utilize, illustratively, but a single feed trough adapted to receive the fruit for discharge. The fruit under such modification of the invention is supplied to the trough at one receiving point and fed through the trough to be discharged at its opposite end. At the time of discharge the trough can be held laterally stationary or its discharge end may be moved in an arcuate path so as to spread the discharged sections over a receiving surface. Alternatively, a single discharge trough may be utilized and arranged to spread the discharged fruit sections in alined fashion and have its receiving end movable so that it is arranged to receive the fruit from a conveyor or other mechanism. Thus, the receiving or the discharge end of a single trough may be shifted in position to receive or discharge the fruit sections. Therefore, according to the present invention and illustrative of its general operation it should be understood that it is intended to provide the feed trough as a medium for conveying fruit from a supply region to a discharge region and at the discharge region provide ways and means whereby the fruit sections from the feed trough may each be discharged in similarly positioned fashion (as per this disclosure in a cup-side-up fashion) upon a receiving surface of any appropriate sort, such as conveyor, trays, a platform or any other component.

Figure 1:
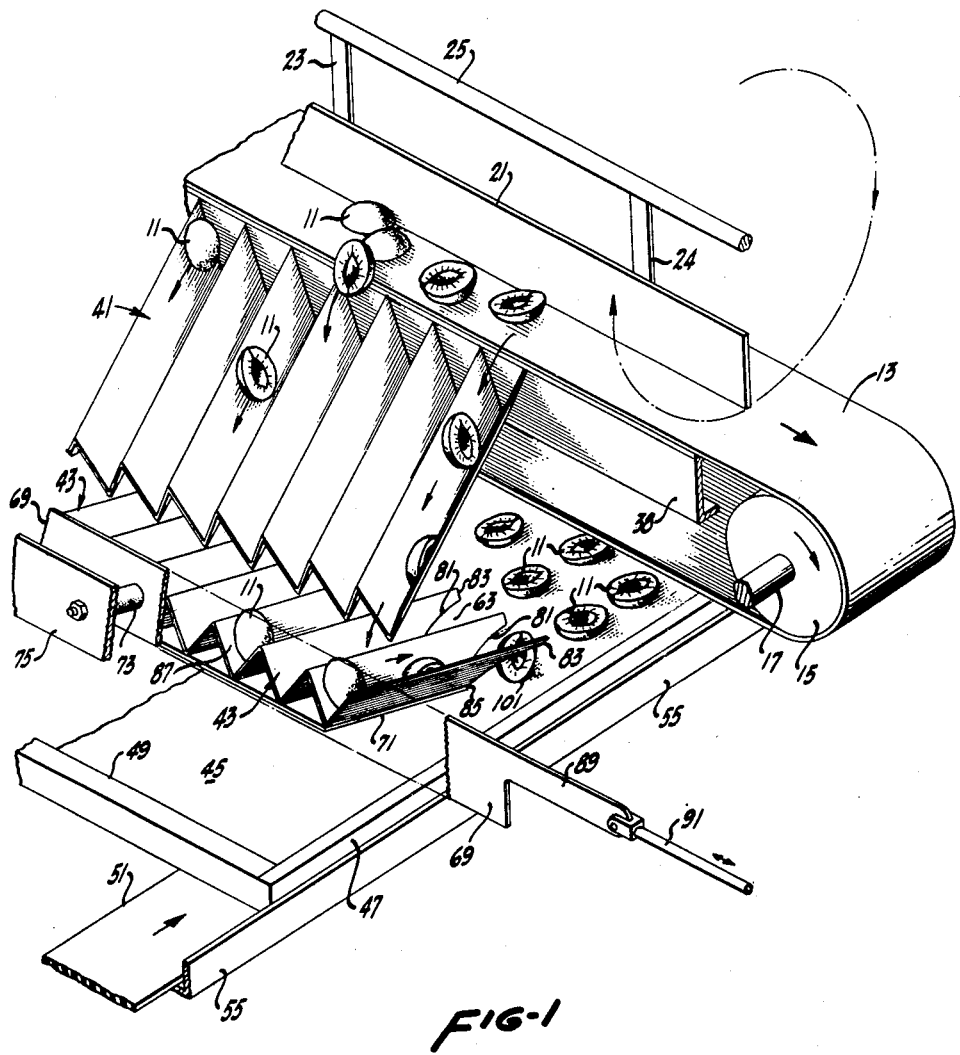

The showing of Fig. 5 suggests a slightly modified constructional form of the device providing that the discharged components can be placed upon either of two endless belt receiving surfaces 105 or 107 and thus carried away from the loading point in two directions. These receiving surfaces are usually in the form of endless belts 105 and 107 arranged to be driven in the conventionally indicated manner by the belt drive pulleys 109 and 111 arranged to turn in the indicated direction although, as shown by Figs. 1 and 3 in particular, the conveyors may carry loading trays (not shown by Fig. 5). Any suitable means may be provided for driving the pulleys over which the endless belt conveyors 105 and 107 are moved, which accounts for the purely diagrammatic showing.

With this modified form of the invention the V-shaped trough member 41 (arranged to receive the fruit components generally in the manner disclosed by all of Figs. 1, 2 and 3) is arranged to discharge the fruit pieces 11 into the V-shaped discharge trough means 115. The V-shaped trough means may be formed in the same general fashion as explained for the trough 43 of all of Figs. 1 through 4 but in this instance are supported from a base 117 upon a frame 119 through the resilient mounting legs 121. The frame 119 may be either an open frame having its side members extend along the base of the V-shaped trough means 115 at the outside of the group with its cross members extending transversely of the trough means, or the frame may be merely a flat supporting plate to which the trough means connects or even rests at the trough V apex. The mounting legs are usually required only at the frame corners, although more similar supports may occasionally be expedient.

A connecting rod 125 is held to the frame 119 at its end 127 in a suitable collar or other securing medium. The rod 125 is vibrated under the control of a vibrating mechanism (not shown by Fig. 5) similar to that disclosed in Fig. 2 for vibrating the connecting rod 91. Vibration, provided by rapid movement of the rod 125 in a back-and-forth direction transverse to the long dimension of the troughs 115, is accordingly induced into the complete trough means 115. With vibration in a direction transverse to the trough, dependent upon the vibrational frequency and thus the mass frequency, the fruit or other object carried by the trough means 115 may be moved toward either the discharge region 131, shown here to the right of the loading position 133 and indicated (purely illustratively) to be above the loading position or toward the discharge region 135 shown to the left (and purely illustratively) below the loading position 133. If desired, the trough means 115 may be arranged to extend generally horizontally and still by vibration through the medium of the rod 125, appropriately driven through the indicated connection, the fruit pieces or other objects may be caused to move along the trough means toward the arcuately notched discharge regions. At this point it may be mentioned that the discharge regions 131 and 135 shown by Fig. 5 are essentially like the discharge ends 63 as shown by Fig. 3 with the notch extending from the outer edge of the trough means, as at 83, to form the notches 81 which terminate at the V apex 85 of the discharge means. In this instance the side walls or side members 87, as shown by Fig. 5, extend outwardly from the V apex in a manner generally similar to the showing in any of Figs. 1 through 4. The fruit half-sections or other objects are discharged at either the discharge end 131 or the discharge end 135 by gravity to come to rest upon the receiving surface 107 or 105.

The V-shaped trough means of any of Figs. 1 through 5 may assume various shapes or configurations. The trough side members or walls 87 may be planar or as shown, for instance, by Fig. 4 and also by portion (b) of Fig. 6 may be generally corrugated. Also, it is within the concept of this invention to provide the side members of the trough means in the form of rods or tubes having various forms of external surfaces which may be in the shape of the rounded rods or tubes 141, as shown by portion (a) of Fig. 6, which rods or tubes extend lengthwise to form the trough. These rods or tubes are appropriately secured to a supporting frame component 143 by spot welding or any other appropriate method. The member 143 forms at its lowermost bends 145 the V-shaped notch of the trough means into which the rods 141 are positioned. The rods are then secured in spaced relationship along this support member. The supports 143 may be appropriately spaced longitudinally of the trough means as desired.

At their ends the rods 141 overhang the support means 143 and to form the discharge regions 131 or 135. In this device the lowermost rod held which is at the bottom of the notch 145 is cut back to the greatest extent and the succeeding rods toward the upper portion of the trough means as at the region 147 are progressively longer so that the terminating region closely approximates that shown for discharge of the fruit half sections or other objects, for instance, in Fig. 3 or 5.

The type of V-shaped trough means disclosed by diagram (a) of Fig. 6 is one which is subject to some degree of modification and the various rods or tubes may also with substantially equal efficiency be made hexagonal, octagonal or even crimped and fluted, as desired.

In some instances the side members or walls of the trough means may be provided as shown by diagram (c) of Fig. 6 in the form of generally planar surfaces 149 but provided with louvres 151 extending longitudinally thereof. This tends generally to prevent the fruit half sections from sticking to the side wall surface as might be the case were the surface completely planar and a vacuum could be created between the fruit cup and the trough side member.

Other forms which the side members or walls may take are shown by diagrams (d) and (e) of Fig. 6 of which the side wall or member 153 of portion (d) is represented as having a checkered pattern with the openings 155 extending therethrough. The form in which the side wall or member 157 of diagram (e) of Fig. 6 may take is a perforated plate of generally planar construction having either a uniformly or non-uniformly distributed opening 159 therein. In all of these constructions of Fig. 6 the trough means forms a V apex at its lowermost point with the side walls or members extending outwardly therefrom. The discharge ends in all instances are generally similarly formed.

Having now described the invention, what is claimed is the following:

1. Fruit handling and spreading apparatus for depositing fruit half-sections upon a receiving surface comprising a generally V-shaped feed trough having planar sides, the trough being supported with the V apex faced downward and also sloping downwardly from a fruit receiving position to a fruit discharging position so that fruit sections held therein and rested against the planar sides tend to move gravitationally toward the discharge position, said planar walls each being notched inwardly along generally arcuate paths from the end toward the trough apex so that fruit half-sections moving along the planar surface are gravitationally discharged at the point where the notches of the side walls merge with the trough apex and are guided by the wall in at least a part of their gravitational drop from the trough so that by reason of the center of gravity of carried fruit sections being laterally displaced from the initial contact point of the discharged fruit with a receiving surface positioned generally adjacent to the trough apex at its discharge end the fruit sections turn by gravity about the initial contact point to a cup-side up position.

2. The fruit handling apparatus claimed in claim 1 comprising, in addition, means to vibrate the trough in a direction transverse to its length for assisting the gravitational movement of the fruit sections with respect thereto.

3. Fruit handling and spreading apparatus for depositing fruit half-sections upon a receiving surface comprising a generally open V-shaped feed trough, the trough being supported with the V apex faced downward from a fruit receiving position to a fruit discharging position so that fruit sections held therein and rested against the trough sides tend to move toward the discharge position, said trough walls each being notched inwardly along generally arcuate paths from the end toward the trough apex so that fruit half-sections moving along the wall surface are gravitationally discharged at the point where the notches of the side walls merge with the trough apex and are guided by the wall in at least a part of their drop from the trough so that by reason of the center of gravity of carried fruit sections being laterally displaced from the initial contact point of the discharged fruit with a receiving surface positioned generally adjacent to the trough apex at its discharge end the fruit sections turn by gravity about the initial contact point to a cup-side up position.

4. Fruit handling and spreading apparatus for depositing fruit half-sections upon a receiving surface comprising a generally open V-shaped feed trough, the trough being supported with the V apex face downward and extending from a fruit receiving position to a discharge position so that fruit sections held within the trough and rested against the sides tend to move longitudinally of the trough to a discharge position, said trough walls each being notched inwardly along generally arcuate paths from the end toward the trough apex, so that fruit half-sections moving along the trough wall are discharged at a point where the notches of the walls merge with the trough apex and are guided by the wall in at least a part of their drop from the trough so that by reason of the center of gravity of the carried fruit sections being laterally displaced from the initial contact point of the discharged fruit upon receiving surface adjacent to the trough apex at its discharge end the fruit sections turn by gravity about the initial contact point to a cup-side up position.

5. Fruit handling and spreading apparatus for depositing fruit half-sections upon a receiving surface comprising a plurality of generally V-shaped feed troughs each having planar sides supported adjacent to each other, the troughs each being supported with the V apex faced downward and sloping downwardly from a fruit receiving position to a fruit discharging position so that fruit sections held thereon and rested against the planar sides tend to move gravitationally toward the discharge position, means to move a fruit receiving component adjacent to the discharge troughs, each of the planar trough walls being notched inwardly along generally arcuate paths from the end toward the trough apex so that fruit half-sections moving along the planar surface are gravitationally discharged at the point where the notches of the side walls merge with the trough apex and are guided by planar side members in at least a part of their gravitational drop from the trough so that by reason of the center of gravity of carried fruit sections being laterally displaced from the initial contact point of discharged fruit sections the fruit sections turn by gravity about the initial contact point to a cup-side up position.

6. The fruit handling apparatus claimed in claim 5 comprising, in addition, means to vibrate the V-shaped troughs in unison in a direction transverse to its length for assisting the gravitational movement of the fruit sections with respect thereto.

7. Fruit handling and spreading apparatus for depositing fruit half sections upon a receiving surface comprising a plurality of generally V-shaped feed troughs each formed of side members located adjacent to each other and adapted to have fruit rest thereon, the troughs each being supported with the V apex faced downward and sloping downwardly from a fruit receiving position in a direction of fruit discharge so that fruit sections held thereon and rested against the side members tend to move toward the discharge position, means to vibrate the trough in a direction tranverse to its length to produce vibration of the fruit held thereon and to cause the so held fruit to move along the trough from the loading point toward the trough end, means to move a fruit receiving component adjacent to the discharge troughs, each of the trough walls being notched inwardly along generally arcuate paths from the end of the side members toward the trough apex so that fruit half-sections moving along the side members are gravitationally discharged at the point where the notches of the side members merge with the trough apex and are guided by side members in at least a part of their gravitational drop from the trough so that by reason of the center of gravity of carried fruit sections being laterally displaced from the initial contact point of discharged fruit sections the fruit sections turn by gravity about the initial contact point to a cup-side up position.

8. The fruit handling apparatus claimed in claim 7 wherein the side members are planar.

9. The fruit handling apparatus claimed in claim 7 wherein the side members are corrugated.

10. The fruit handling apparatus claimed in claim 7 wherein the side members are louvered.

11. The fruit handling apparatus claimed in claim 7 wherein the side members comprise a plurality of generally coplanar rods spaced from each other.

12. The fruit handling apparatus claimed in claim 7 wherein the side members are perforated sheets.

13. Fruit handling and spreading apparatus for depositing fruit half-sections upon a receiving surface comprising a plurality of adjacent V-shaped troughs each turned with a V apex toward the receiving surface and each sloping downwardly from a fruit receiving position toward a discharge surface so that fruit half-sections placed thereon tend to move gravitationally toward the discharge position, each of said V-shaped troughs having side walls and each having the side walls at the discharge end arcuately notched from a point between its outer edge and the edge meeting at the trough apex with each arcuate notch curving to merge at the trough apex inwardly from the end of the trough wall so that fruit half-sections moving along the trough and rested upon either trough wall tends to move gravitationally toward the trough apex end of each notch at which point the fruit half-section is gravitationally discharged while being guided temporarily by the trough wall so that due to the center of gravity of each fruit piece, as discharged, being laterally at one side or the other of the initial discharge point of the fruit section is gravitationally turned about its point first emerging from the trough to a cup-side up position.

14. Fruit handling and spreading apparatus for depositing fruit half-sections upon a receiving surface comprising a plurality of adjacent V-shaped troughs each turned with the V apex toward the receiving surface and each sloping from a fruit receiving position toward a discharge surface so that fruit half-sections placed thereon tend to move toward the discharge position, each of said V-shaped troughs having side walls and each having the side walls at the discharge end arcuately notched from a point between its outer edge and the edge meeting at the trough apex with each arcuate notch curving to merge at the trough apex inwardly from the end of the trough wall so that fruit half-sections moving along the trough and rested upon the trough walls tend to move toward the trough apex end of each notch at which point the fruit half-section is gravitationally discharged while being guided temporarily by the trough wall so that due to the center of gravity of each fruit piece, as discharged, being laterally displaced relative to the initial discharge point the fruit section is gravitationally turned about its point first emerging from the trough to a cup-side up position, and means for loading the multiplicity of troughs substantially simultaneously.

15. The apparatus claimed in claim 14 comprising, in addition, means for moving a receiving surface relative to the discharge end of the trough, thereby to receive successively discharged fruit sections.

16. The fruit handling apparatus claimed in claim 15 comprising, in addition, means to vibrate the trough in a direction transverse to its length for assisting the gravitational movement of the fruit sections with respect thereto.

17. Fruit handling and spreading apparatus for depositing fruit half-sections upon a receiving surface comprising V-shaped trough means having the V apex faced toward the receiving surface and extending from a loading position toward a discharge region substantially adjacent to the fruit receiving surface with the discharge to the fruit receiving surface being gravitationally affected as the fruit pieces move from the loading to discharge regions, means for loading the trough means at a point inwardly from the discharge end, and means to vibrate the trough means in a direction transverse to the trough length to cause fruit supported in the trough means to move longitudinally of the trough from the loading position toward the discharge region at the end of the trough means, the said V-shaped trough means having side members extending outwardly from the V apex to receive the fruit pieces, the discharge end of the trough means being arcuately notched from a point between the outer edge of the trough members and the edges meeting at the trough apex with each arcuate notch curving to merge at substantially the trough apex inwardly from the discharge region of the trough so that fruit half-sections moving along the trough means and rested against the trough side members are gravitationally discharged at the end of the trough means while guided temporarily by the trough side members whereupon due to the center of gravity of each half-section fruit piece at discharge being laterally displaced relative to the initial discharge point at the apex of the trough means the fruit half-section is gravitationally turned about its point first emerging from the trough means to a cup-side-up position.

18. Fruit handling and spreading apparatus for depositing fruit half-sections upon receiving surfaces comprising V-shaped trough means having the V apex faced toward the receiving surface and extending from a loading position toward discharge regions substantially adjacent to the fruit receiving surfaces with the discharge to the fruit receiving surface being gravitationally affected as the fruit pieces move from the loading to discharge regions, means for loading the trough means at a point inwardly from each discharge end, and means to vibrate the trough means in a direction transverse to the trough length to cause fruit supported in the trough means to move longitudinally along the trough from the loading point toward the discharge region at the ends of the trough means, the said V-shaped trough means having side members extending outwardly from the V apex to receive and guide the fruit pieces therealong, the discharge ends of the trough means being arcuately notched from a point between the outer edge of the trough side members and the edges meeting at the trough apex with each arcuate notch curving to merge at substantially the trough apex inwardly from the discharge region of the trough so that fruit half-sections moving along the trough means and rested against the trough side members are gravitationally discharged at the ends of the trough means while guided temporarily by the trough side members whereupon due to the center of gravity of each half-section fruit piece at discharge being laterally displaced relative to the initial discharge point at the apex of the trough means the fruit section is gravitationally turned about its points first emerging from the trough means to a cup-side-up position.

References Cited in the file of this patent

UNITED STATES PATENTS

| | | |
|---|---|---|
| 2,155,612 | Morris | Apr. 25, 1939 |
| 2,610,724 | Dudley | Sept. 16, 1952 |